（12） United States Patent
Ross et al.

(10) Patent No.: US 9,104,516 B2
(45) Date of Patent: Aug. 11, 2015

(54) METHODS AND SYSTEMS FOR DEPLOYING SOFTWARE APPLICATIONS

(71) Applicant: The Boeing Company, Huntington Beach, CA (US)

(72) Inventors: James G. Ross, Chino Hills, CA (US); Anthony M. Stamp, Sterling, VA (US); Zachary R. Nelson, Costa Mesa, CA (US); Matthew S. Gill, Walnut, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/472,707

(22) Filed: Aug. 29, 2014

(65) Prior Publication Data

US 2014/0372979 A1 Dec. 18, 2014

Related U.S. Application Data

(63) Continuation of application No. 12/824,815, filed on Jun. 28, 2010, now Pat. No. 8,826,231.

(51) Int. Cl.
*G06F 9/44* (2006.01)
*G06F 9/445* (2006.01)
*G06F 21/12* (2013.01)
*G06F 21/62* (2013.01)

(52) U.S. Cl.
CPC .. *G06F 8/60* (2013.01); *G06F 8/70* (2013.01); *G06F 21/125* (2013.01); *G06F 21/6227* (2013.01); *G06F 2221/2149* (2013.01)

(58) Field of Classification Search
CPC .............. G06F 21/125; G06F 21/6227; G06F 2221/2149
See application file for complete search history.

(56) References Cited

U.S. PATENT DOCUMENTS

| 5,461,698 | A  | * | 10/1995 | Schwanke et al. | 706/20 |
| 6,574,737 | B1 | * | 6/2003  | Kingsford et al. | 726/25 |
| 2004/0044902 | A1 | * | 3/2004 | Luthi | 713/200 |
| 2007/0169189 | A1 | * | 7/2007 | Crespo et al. | 726/20 |
| 2008/0256638 | A1 |   | 10/2008 | Russ et al. | |
| 2008/0263671 | A1 |   | 10/2008 | Solino Testa et al. | |
| 2009/0007270 | A1 |   | 1/2009 | Futoransky et al. | |

FOREIGN PATENT DOCUMENTS

WO 2009038818 A2 3/2009

OTHER PUBLICATIONS

Smith, C.; AFA Cyber Demonstration Plan and Script; Global Network Operations Cyber & Information Solutions; Boeing; Aug. 13, 2009; pp. 1-13.

Integrated Cyber Operations Demonstration—Intelligence & Security Systems—Cyber & Information Solutions; 2009 Boeing; pp. 1-4.

(Continued)

*Primary Examiner* — Anna Deng
(74) *Attorney, Agent, or Firm* — Armstrong Teasdale LLP

(57) ABSTRACT

A method for assembling a plurality of software modules for executing at least one task is described. The method includes selecting at least one software module from a plurality of available software modules, the one or more software modules selected based on at least one task to be performed, if more than one software module is selected, then configuring the selected software modules to function together in a manner to perform the at least one task to be performed, and generating a cyber package including the at least one software module, the cyber package conforming to a pre-defined protocol.

18 Claims, 4 Drawing Sheets

(56) References Cited

OTHER PUBLICATIONS

Smith, C. et al.; Global Network Operations—Cyber Technology Solutions—Enabling Integrated, Synchronized, Coordinated Cyber Operations; 2009 Boeing; pp. 1-2.

Smith, C. et al; Cyber Operations Demonstration; 2009 Boeing; pp. 1-2.

Integrated Defense System—Cyber Planning, Rehearsal, and Attack Mission Services (CPRAMS); 2009 Boeing; 1 page.

\* cited by examiner

METHODS AND SYSTEMS FOR DEPLOYING SOFTWARE APPLICATIONS

CROSS-REFERENCE TO RELATED APPLICATIONS

This application is a continuation application of U.S. patent application Ser. No. 12/824,815, filed Jun. 28, 2010, entitled "METHODS AND SYSTEMS FOR DEPLOYING SOFTWARE APPLICATIONS", the disclosure of which is hereby incorporated herein by reference in its entirety.

BACKGROUND

The subject matter described herein relates generally to software development and, more particularly, to methods and systems for deploying software applications.

At least some known software development systems use rigid parameters for developing mission-related software. Such parameters may limit the options available to a designer. For example, many known software development systems are not designed to use component classification systems and/or are not designed to use interchangeable components. As a result, the complexity of all the necessary software for development is often increased. At least some known software development systems do not include encryption and/or security mechanisms that restrict a user and/or developer of one component from accessing another component based on the user and/or developer's access to the one component.

Moreover, current standards and methodologies for use in developing and/or deploying software applications are generally not sophisticated enough to be used in observe-orient-decide-act loops. As such, current software development methodologies do not provide the modularity or reusability to quickly integrate existing software applications to meet the specific needs of a mission. Furthermore, certain known planning cycles are generally too short in development time to enable testing, debugging, and/or development of new implementations of software applications.

BRIEF DESCRIPTION

In one embodiment, a method is provided for assembling a plurality of software modules for executing at least one task. The method includes selecting at least one software module from a plurality of available software modules, the one or more software modules selected based on at least one task to be performed, if more than one software module is selected, then configuring the selected software modules to function together in a manner to perform the at least one task to be performed, and generating a cyber package including the at least one software module, the cyber package conforming to a pre-defined protocol.

In another embodiment, a mission development system for the selection of software modules for the execution of at least one task is provided. The system includes a memory device and a processor coupled to the memory device. The system is programmed to select at least one software module from a plurality of available software modules within said memory device, the one or more software modules selected based on the at least one task to be performed, if more than one software module is selected, then said system programmed to configure the selected software modules to function together in a manner to perform the at least one task to be performed, and generate a cyber package including the at least one software module, the cyber package conforming to a pre-defined protocol.

The features, functions, and advantages described herein can be achieved independently in various embodiments of the present invention or may be combined in yet other embodiments further details of which can be seen with reference to the following description and drawings.

DETAILED DESCRIPTION

Figure 1:
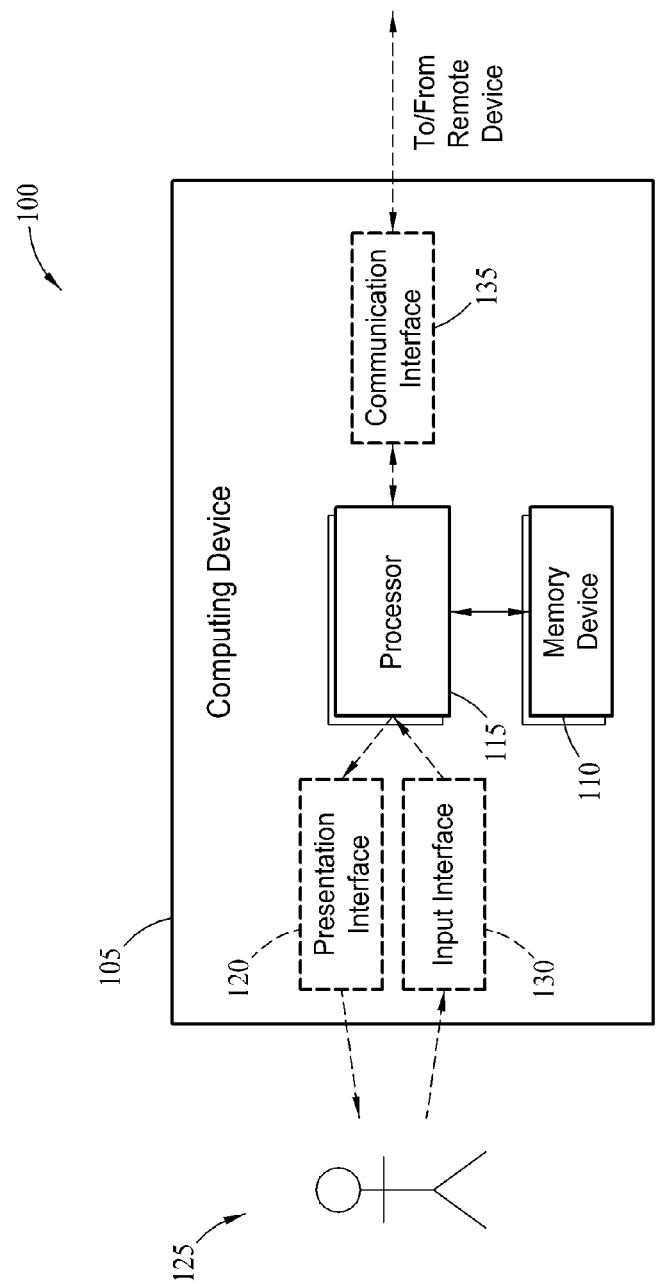
FIG. 1 is a block diagram of an exemplary computing device.

The subject matter described herein relates generally to the development, provisioning, and implementation of software for use in computer-based systems. More particularly, the subject matter described herein relates to methods and systems for use in deploying software applications on remote computer systems. The methods and systems described herein enable customized missions to be developed, without requiring specific development of software, by integrating modular software components together. Particularly, and in embodiments, various software components are modularly built and packaged together into a software package, which is sometimes referred to herein as a cyber package. Utilization of such "software modules," each of which is at least a portion of a software application, supports a methodology where swapping certain of the developed software modules with other modularly built software modules allows a user to develop a rich and diverse mission portfolio of packaged software applications (e.g., cyber packages). Such software components are developed, provisioned such that they are interoperable with one another, packaged (e.g., into an encrypted package that allows multi-level security and secure resource sharing) and the resulting software applications are finally loaded onto a hardware platform from which they may be deployed, for example, at a second hardware platform that is remotely located In one embodiment, a mission system includes a memory device and a processor that is coupled to the memory device. The mission system supports the design, development, and implementation of software applications defined by the one or more packaged reusable software modules. Specifically, the mission system integrates a plurality of designed and developed software modules to define one or more software applications.

Each software module includes identifying data and restricted data. Within each module, the identifying data is accessible to a user, but access to the restricted data, of at least one of the software modules, is limited to authorized users only. The software modules are modular. Thus, any desired combination of software modules may be packaged by a user into a customizable software application that can be loaded onto a platform for deployment and/or execution. Specifically, during use, after a user selects the desired modules, the selected modules are then provisioned, packaged into an integrated cyber package of software modules, which can then be loaded onto any suitable hardware platform for deployment and/or execution.

An exemplary technical effect of the methods and systems described herein includes at least one of (a) selecting a plurality of software modules based upon at least one objective to be met upon execution of the selected modules; (b) classifying each of the plurality of modules into a plurality of predefined categories; (c) associating each of the plurality of categories with a respective encryption; (d) determining an access privilege of the user; (e) permitting the user, having appropriate access privileges, to access the restricted data of at least one of the plurality of modules; (f) restricting the user, not having appropriate access privileges, from accessing the restricted data of at least one of the plurality of modules; (g) provisioning the plurality of modules for use as a cyber package based on one or more parameters; (h) conducting a test of at least one of the plurality of modules; (i) packaging the plurality of modules into the cyber package; (j) encrypting the cyber package without exposing at least one of content of the cyber package and the objective; (k) loading the cyber package onto a platform for deployment; and (l) deploying the cyber package such that the first module and the second module are redeployable; (m) executing the cyber package to facilitate meeting the objective of the cyber package; and (n) tracking the cyber package upon delivering the cyber package to monitor at least one effect of the cyber package.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

FIG. 1 is a block diagram of an exemplary mission system 100 that includes an exemplary computing device 105 that may be used to integrate software modules for use in software applications. A "software application", as described herein, is a software program developed for a particular purpose. A "module", as described herein, is a software program that is compatible with mission system 100. The module may be a stand-alone software application and/or be used in a "cyber package", which, as described herein, is an aggregation of modules for use in executing a cyber mission. "Cyber mission", as described herein, is an objective, scenario, and/or task to be executed and/or completed.

Computing device 105 includes a memory device 110 and a processor 115 that is coupled to memory device 110 for executing programmed instructions. In some embodiments, executable instructions and/or module-related data are stored in memory device 110. Computing device 105 is programmable to perform one or more operations described herein through the programming of memory device 110 and/or processor 115. For example, processor 115 may be programmed by encoding an operation as one or more executable instructions and providing the executable instructions in memory device 110. Processor 115 may include one or more processing units (e.g., in a multi-core configuration).

Processor 115 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

Memory device 110 is one or more devices that enable information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, executable instructions, configuration data, module data, and/or any other type of data.

In the exemplary embodiment, computing device 105 includes a presentation interface 120 that is coupled to processor 115. Presentation interface 120 outputs (e.g., display, print, and/or otherwise output) information, such as, but not limited to, configuration data, software module data, data relating to the packaging of software modules, and/or any other type of data to a user 125. For example, presentation interface 120 may include a display adapter (not shown in FIG. 1) that is coupled to a display device, such as a cathode ray tube (CRT), a liquid crystal display (LCD), a light-emitting diode (LED) display, an organic LED (OLED) display, and/or an "electronic ink" display. In some embodiments, presentation interface 120 includes more than one display device. In addition to, or in the alternative, presentation interface 120 may include a printer.

In the exemplary embodiment, computing device 105 includes an input interface 130 that receives input from user 125. For example, input interface 130 may be configured to receive an indication of configuration data, module data, and/or any other type of data suitable for use with the methods and systems described herein. As described in further detail below, computing device 105 uses the received input to develop and/or implement a software application using one or more software modules. In the exemplary embodiment, input interface 130 is coupled to processor 115 and may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 120 and as input interface 130.

In the exemplary embodiment, computing device 105 includes a communication interface 135 coupled to memory device 110 and/or processor 115. Communication interface 135 is coupled in communication with a remote device, such as another computing device 105. For example, communication interface 135 may include, without limitation, a wired network adapter, a wireless network adapter, and/or a mobile telecommunications adapter. The remote device may be a network of computing devices that are accessible via the Internet.

Figure 2:
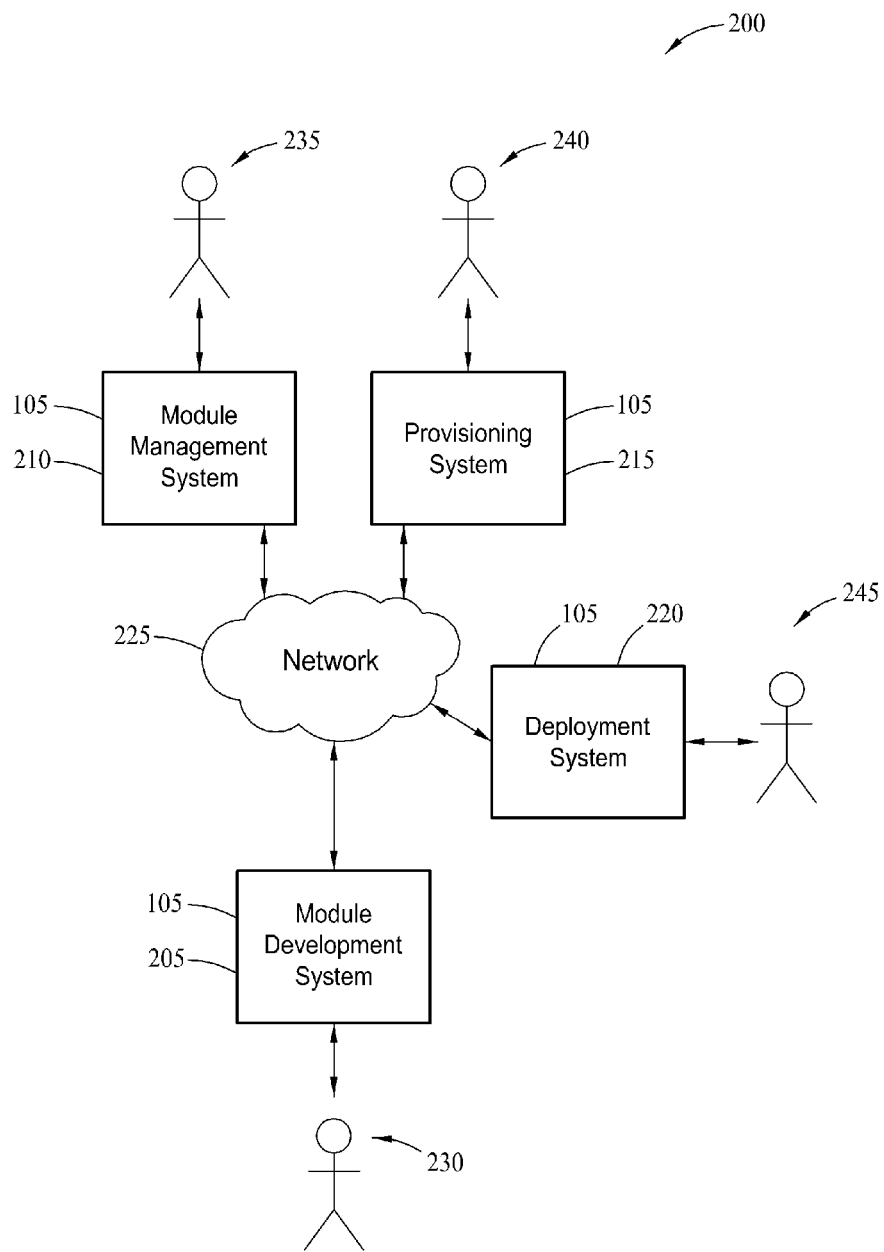
FIG. 2 is a block diagram of an exemplary mission system including the computer device shown in FIG. 1.

FIG. 2 is a block diagram of an exemplary system 200 that may be used to develop and integrate software modules to develop and/or implement software applications. In the exemplary embodiment, system 200 includes a module development system 205, a module management system 210, a provisioning system 215, and a deployment system 220 that are each coupled in communication via a network 225. Network 225 may include, without limitation, the Internet, a local area network (LAN), a wide area network (WAN), a wireless LAN (WLAN), a mesh network, and/or a virtual private network (VPN).

Module development system 205, module management system 210, provisioning system 215, and deployment system 220 may be instances of computing devices 105 (shown in FIG. 1). In the exemplary embodiment, each computing device 105 is coupled to network 225 via communication interface 135. In an alternative embodiment, any combination of module development system 205, module management system 210, provisioning system 215, and/or deployment system may be integrated with each other. Notably, one or more users 125 may operate any combination of module development system 205, module management system 210, provisioning system 215, and/or deployment system 220.

In the exemplary embodiment, module development system 205 interacts with a module developer 230 (e.g., via input interface 130 and/or presentation interface 120). Module developer 230 develops at least one software module (shown in FIG. 3) at module development system 205, and module development system 205 receives, from module developer 230, an association of software modules and/or any other potential components utilized to form software applications. Module development system 205 transmits via network 225 the software module associations to module management system 210.

Module management system 210 receives and stores the association (e.g., in memory device 110). In some embodiments, module management system 210 stores one or more attributes corresponding to specific software modules and/or any other potential component of the software application. In the exemplary embodiment, an application designer 235 selects at least one software module using module management system 210 to execute a cyber mission. In one embodiment, application designer 235 provides a cyber mission, and module management system 210 recommends and/or selects a suitable combination of software modules to execute and/or complete the cyber mission.

The selected combination of software modules is transmitted via network 225 to provisioning system 215. An application provisioner 240 interacts with provisioning system 215 (e.g., via input interface 130 and/or presentation interface 120) to create a software application based at least in part on the selected modules. More specifically, provisioning system 215 configures and/or programs the modules to function together as a cyber package for use in executing and/or completing the cyber mission. Provisioning system 215 transmits via network 225 the cyber package to deployment system 220.

Deployment system 220 receives the cyber package in the form of one or more software applications each of which includes at least one software module from provisioning system 215 and interacts with an application deployer 245 (e.g., via input interface 130 and/or presentation interface 120). In the exemplary embodiment, the cyber package is loaded on deployment system 220, wherein the cyber package is stored and provides a platform while the cyber package awaits a command from application deployer 245. In the exemplary embodiment, application deployer 245 may selectively execute the cyber package, abort a running application of the cyber package, and/or unload the cyber package from deployment system 220. Deployment system 220 supports a communication channel between the deployment platform and the deployed cyber package. Advanced communication payloads are implemented supporting encrypted data pathways and are interchangeable between normal, basic, communication pathways.

Figure 3:
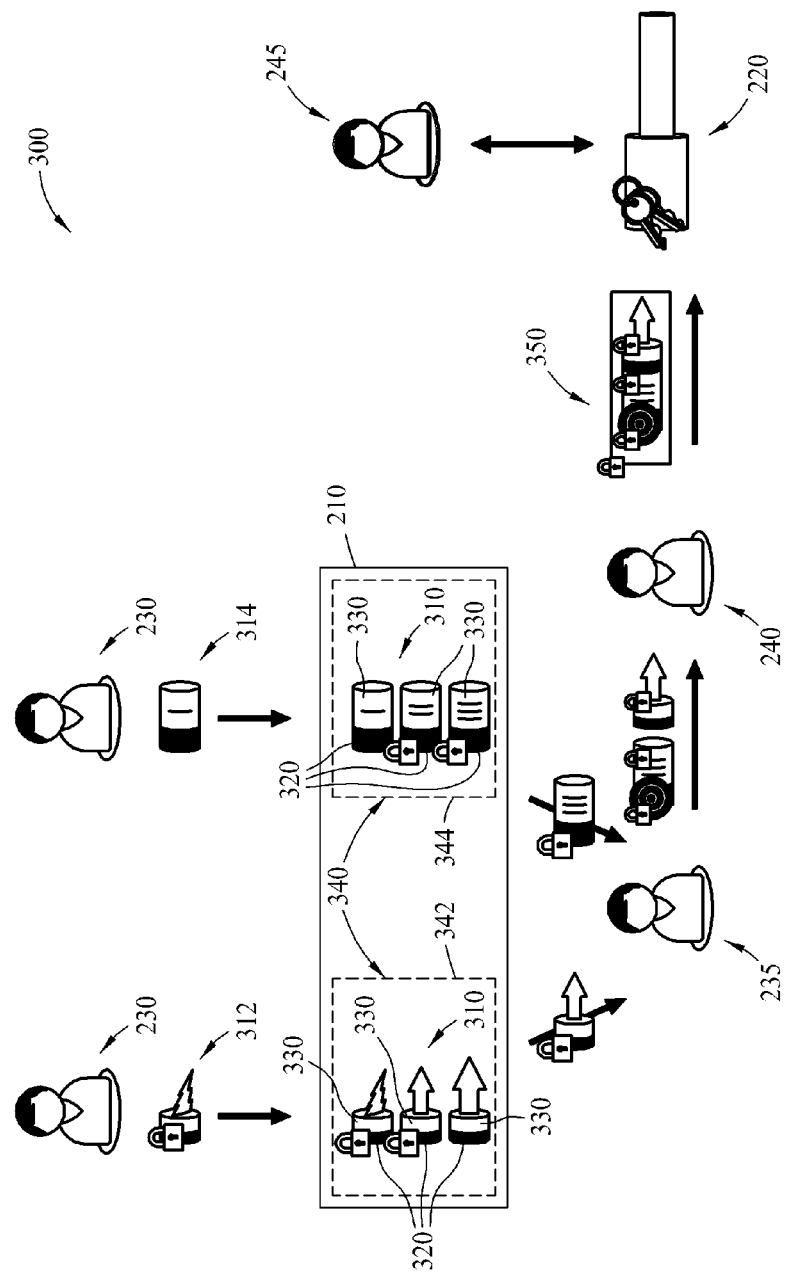
FIG. 3 is a schematic illustration of an exemplary method for deploying software applications that may be developed using the system shown in FIG. 2.
Figure 4:
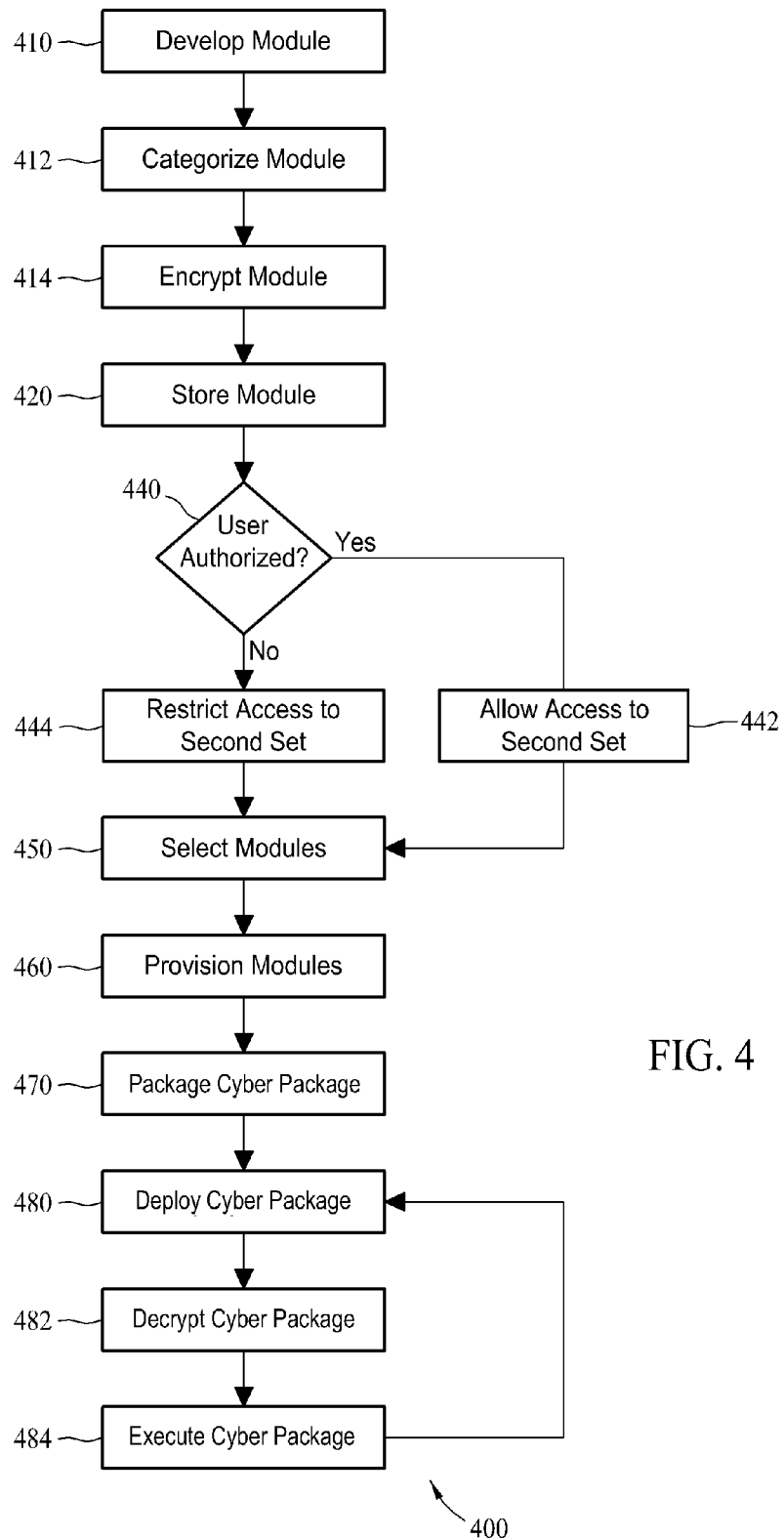
FIG. 4 is a flow chart illustrating an exemplary method for deploying software applications that may be developed using the system shown in FIG. 2.

FIG. 3 is a schematic illustration 300 and FIG. 4 is a flow chart of an exemplary method 400 for integrating software for a software application. At least portion of method 400 may be performed, for example, by any one of or any combination of computing devices 105 in system 200.

Initially, module developer 230 develops 410 at least one module 310 that may be used in a software application. Each module 310 is a discrete piece of software developed 410 for a particular purpose. For example, a first module 312 may be programmed to enable a first feature, and second module 314 may be programmed to enable a second feature.

In the exemplary embodiment, modules 310 are categorized 412 into a plurality of categories 340. More specifically, in the exemplary embodiment, modules 310 are classified based on component type. For example, a first category 342 may include modules 310 programmed to enable a first type of feature (e.g., an exploit), and a second category 344 may include modules 310 programmed to enable a second type of feature (e.g., a payload).

In the exemplary embodiment, each module 310 includes at least a first set 320 of software code and data and a second set 330 of software code and data. First set 320 includes, for example, identifying data, such as a component identifier, a component type, a component feature, a component narrative, and/or any other suitable information. Notably, first set 320 may be encrypted 414 such that the first set information is made accessible to at least one user 125. First set 320 may be referred to herein as a user accessible portion of a software module. Second set 330 includes more detailed information, such as source code, an algorithm, security data, and/or other secure information. Notably, second set 330 includes restricted data and may be encrypted 414 with heightened security requirements, relative to first set 320, such that the second set information is accessible only by at least one user 125 and, more specifically, the module-specific module developer 230. Second set 330 may be referred to herein as a user restricted portion of a software module. In the exemplary embodiment, modules 310 are stored 420 in memory device 110, and application designer 235 may access modules 310 via module management system 210.

In one embodiment, an access privilege of a user 125 is determined 440, and, based on the user's access privilege, user 125 may be allowed 442 to access second set 330 of at least one module 310. Moreover, based on the determined access privilege, user 125 may be restricted 444 from accessing second set 330 of at least one module 310. For example, in such an embodiment, user 125 may be allowed 442 to access every second set 330, be restricted 444 from accessing any second set 330, and any accessibility scheme therebetween. In the exemplary embodiment, each module developer 230 is permitted 442 to access second set 330 for only module(s) 310 developed by module developer 230, and application designer 235, application provisioner 240, and/or application deployer 245 are restricted 444 from accessing second set 330 for any module 310.

In the exemplary embodiment, application designer 235 selects 450 at least one module 310, via input interface 130, to develop a cyber package 350 for use in the software application. In one embodiment, a module may be selected based on at least one of the first set information (user accessible portion) only, the second set information (user restricted portion) only, and some combination of the first set information and second set information of the module. In one embodiment, application designer 235 provides a desired cyber mission, and, based on the desired cyber mission, module management system 210 recommends and/or selects 450 at least one module 310 automatically.

Before packaging selected modules 310 into cyber package 350, each module 310 is suitably provisioned 460 for use in cyber package 350. Thus, in the exemplary embodiment, modules 310 are standardized such that modules 310 are packageable into cyber package 350. In one embodiment, modules 310 are tested to ensure that modules 310 are compatible and/or serviceable. For example, an intended and/or collateral effect of a module 310 may be quantified. During provisioning, modules 310 and/or cyber package 350 are suitably protected such that the encryption remains intact, thereby ensuring that unauthorized users are not able to access sensitive information. More specifically, in the exemplary embodiment, each module 310 to be packaged in cyber package 350 retains its respective encryption.

Cyber package 350 is then packaged 470 and/or modularly built using at least one selected module 310, and cyber package 350 is provisioned appropriately with parameters and/or contexts, such as target information, deployment scheduling, internet protocols, ports, and/or meta-data. As such, a diverse and/or rich portfolio of cyber packages 350 may be packaged and/or assembled with parameters and/or contexts necessary for a desired software application. In the exemplary embodiment, cyber package 350 is encrypted and/or is associated with an access privilege that is different from an encryption and/or an access privilege of its modules 310. In one embodiment, each user 125 is restricted from accessing second set 330 for each module 310 packaged into cyber package 350.

Once cyber package 350 is packaged, cyber package 350 is transmitted to deployment system 220, from which cyber package 350 is deployed 480. Upon deployment, in one embodiment, cyber package 350 is decrypted 482 for use, is executed 484 for use, and/or is tracked to facilitate monitoring at least one effect of cyber package 350. For example, in such an embodiment, it may be desirable to determine whether cyber package 350 and/or its modules 310 were executed 484 properly. In the exemplary embodiment, each module 310 and/or cyber package 350 is redeployable such that module 310 and/or cyber package 350 may be used in a subsequent application. In one embodiment, module developer 230 and/or application provisioner 240 may need to schedule access to module 310 and/or cyber package 350 due to limited resources.

In the exemplary embodiment, modules 310 are developed to function suitably together and have common means of communication. Cyber package 350 is suitably versatile, such that any module 310 from any category 340 may be selected to facilitate development of cyber package 350. In one embodiment, cyber package 350 includes a module 310 from each category 340. Alternatively, the embodiments described herein are suitably flexible to accommodate any combination and/or quantity of modules 310 to develop a desired cyber package 350.

In summary, the described embodiments provide a method for assembling a plurality of software modules for executing at least one task. In one embodiment, such method includes selecting at least one software module from a plurality of available software modules, the one or more software modules selected based on at least one task to be performed. If more than one software module is selected, the method includes configuring the selected software modules to function together in a manner to perform the at least one task to be performed. In addition, the method further includes generating a cyber package including the at least one software module, the cyber package conforming to a pre-defined protocol useful in deploying the cyber package.

In further embodiments, the method includes encrypting the cyber package to protect a content of the cyber package and providing the cyber package to an external computer system for execution of the at least one software module, and may further include tracking the execution of the at least one software module on the external computer system to monitor at least one effect of the cyber package.

Each of the plurality of software modules by be classified into one of a plurality of predefined categories as described above. As such, an automated version might incorporate a process that includes including at least one software module from each of the predefined categories into the cyber package and/or associating each of the plurality of categories with a respective encryption method.

Encrypting the cyber package to enable multiple levels of security and secure resource sharing between software modules within the cyber package is contemplated, as is configuring at least one of the software modules to include a first set of data and a second set of data, such that access to the second set of data is more restricted than is access to the first set of data.

As described above, the software modules may include a varying degree of access. In such scenarios, an access privilege of a user will be determined, permitting the user to access the second set of data associated with at least one of the plurality of software modules based on the access privilege, and restricting the user from accessing the second set of data associated with at least one other of the plurality of software modules based on the access privilege.

In order for the selected software modules to function together a communications capability is provided between the software modules. As described above, one or more of selectively executing the cyber package, aborting a running application of the cyber package, and unloading the cyber package from the external system are performed by the system. In addition, the cyber packages may be automatically generated and therefore cyber packages which include all the possible combinations of the plurality of available software modules.

The embodiments described herein provide the ability to create a software application to execute a cyber mission using pre-developed modules. More specifically, the exemplary methods and systems provide for deploying software application. As such, the exemplary methods and systems facilitate increasing an effectiveness of a software application, decreasing the software application planning time, increasing reuse of the software application, retaining security of the software application and its components, and decreasing long term software costs of the software application. Moreover, the exemplary methods and systems provide encryption and/or security mechanisms to facilitate restricting a user and/or developer of one component from accessing another component based on the user and/or developer's access to the one component. Different users, having different responsibilities, may operate and/or use the systems described herein at different steps of the process.

The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for deploying a cyber package for remote execution of at least one task, said method comprising:
   selecting a plurality of software modules from a plurality of available software modules, the selected plurality of software modules including at least a first software module selected from a first predefined category and a second software module selected from a second predefined category;
   integrating the plurality of selected software modules into a cyber package to function together to perform the at least one task;
   provisioning the cyber package with one or more parameters, wherein the one or more parameters is selected from target information, deployment scheduling, internet protocols, ports, and meta-data; and
   deploying the cyber package to a remote device for execution at the remote device based on the one or more parameters,
   wherein the first software module includes a first access privilege, the second software module includes a second access privilege, and the cyber package includes a third access privilege different from the first access privilege and the second access privilege.

2. The method of claim 1 wherein integrating the plurality of selected software modules to function together comprises providing a communications capability between the software modules.

3. The method of claim 2 wherein the communications capability comprises a common means of communication.

4. The method of claim 1 wherein the first predefined category includes modules programmed to enable a first type of feature, and the second predefined category includes modules programmed to enable a second type of feature.

5. The method of claim 4 wherein the first software module is programmed to enable a first feature and the second module is programmed to enable a second feature.

6. The method of claim 5 wherein the first feature comprises an exploit and the second feature comprises a payload.

7. The method of claim 1 further comprising:
   storing the cyber package on a deployment system.

8. The method of claim 7 further comprising redeploying the cyber package in a subsequent application.

9. The method of claim 1 wherein the cyber package includes the third access privilege different from an access privilege of the plurality of selected software modules.

10. A mission development system for deploying a cyber package for remote execution of at least one task, said system comprising:
    a memory device; and
    a processor coupled to said memory device, wherein said system is programmed to:
       receive a selection of a plurality of software modules from a plurality of available software modules, the selected plurality of software modules including at least a first software module selected from a first predefined category and a second software module selected from a second predefined category;
       integrate the plurality of selected software modules into a cyber package to function together to perform the at least one task;
       provision the cyber package with one or more parameters, wherein the one or more parameters is selected from target information, deployment scheduling, internet protocols, ports, and meta-data; and
       deploy the cyber package to a remote device for execution at the remote device based on the one or more parameters,
       wherein the first software module includes a first access privilege, the second software module includes a second access privilege, and the cyber package includes a third access privilege different from the first access privilege and the second access privilege.

11. The mission deployment system of claim 10 wherein said system is configured to integrate the plurality of selected software modules to function together by providing a communications capability between the software modules.

12. The mission deployment system of claim 11 wherein the communications capability comprises a common means of communication.

13. The mission deployment system of claim 10 wherein the first predefined category includes modules programmed to enable a first type of feature, and the second predefined category includes modules programmed to enable a second type of feature.

14. The mission deployment system of claim 13 wherein the first software module is programmed to enable a first feature and the second module is programmed to enable a second feature.

15. The mission deployment system of claim 14 wherein the first feature comprises an exploit and the second feature comprises a payload.

16. The mission deployment system of claim 10 wherein said system is further programmed to:
    store the cyber package on a deployment system.

17. The mission deployment system of claim 16 wherein said system is further programmed to redeploy the cyber package in a subsequent application.

18. The mission deployment system of claim 10 wherein the cyber package includes the third access privilege different from an access privilege of the plurality of selected software modules.

* * * * *